United States Patent
Wang et al.

(10) Patent No.: US 10,475,484 B2
(45) Date of Patent: Nov. 12, 2019

(54) METHOD AND DEVICE FOR PROCESSING SPEECH BASED ON ARTIFICIAL INTELLIGENCE

(71) Applicant: BAIDU ONLINE NETWORK TECHNOLOGY (BEIJING) CO., LTD., Beijing (CN)

(72) Inventors: Zhijian Wang, Beijing (CN); Sheng Qian, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 216 days.

(21) Appl. No.: 15/638,462

(22) Filed: Jun. 30, 2017

(65) Prior Publication Data
US 2018/0166103 A1 Jun. 14, 2018

(30) Foreign Application Priority Data
Dec. 9, 2016 (CN) .......................... 2016 1 1132359

(51) Int. Cl.
G11B 27/22 (2006.01)
G10L 25/78 (2013.01)
G11B 27/19 (2006.01)

(52) U.S. Cl.
CPC ............. G11B 27/22 (2013.01); G10L 25/78 (2013.01); G11B 27/19 (2013.01)

(58) Field of Classification Search
CPC ................................ G10L 25/78; G10L 25/30
USPC ................................................. 704/232, 215
See application file for complete search history.

(56) References Cited

U.S. PATENT DOCUMENTS

| | | | | |
|---|---|---|---|---|
| 2010/0145687 A1* | 6/2010 | Huo | ..................... | G10L 21/0208 704/206 |
| 2014/0025374 A1* | 1/2014 | Lou | ..................... | G10L 21/0216 704/203 |
| 2014/0244269 A1* | 8/2014 | Tokutake | ................ | G10L 15/00 704/275 |
| 2014/0330564 A1* | 11/2014 | Cox | ......................... | G10L 15/02 704/238 |
| 2014/0379343 A1* | 12/2014 | Karimi-Cherkandi | ...................... | G10L 21/02 704/246 |
| 2015/0228277 A1* | 8/2015 | Anhari | ..................... | G10L 25/51 704/232 |
| 2016/0055846 A1* | 2/2016 | Jung | ........................ | G10L 15/20 704/233 |
| 2016/0379622 A1* | 12/2016 | Patel | ........................ | G10L 13/06 704/260 |
| 2017/0103752 A1* | 4/2017 | Senior | ..................... | G10L 15/16 |

* cited by examiner

Primary Examiner — Jakieda R Jackson
(74) Attorney, Agent, or Firm — Hodgson Russ LLP

(57) ABSTRACT

The present disclosure discloses a method including: performing a silence detection on a speech to be decoded; cutting the speech to be decoded off to obtain a target speech if detecting that the speech to be detected is a silent speech; resetting tail features of the target speech with preset tail features of silent frames; and performing a CTC decoding process on the target speech reset. In embodiments, when a large number of blank frames are carried in the speech to be decoded, the speech to be decoded is cut off, and the tail features of the target speech is placed with the tail features of the silent frames such that there may be one CTC peak when the CTC decoding process is performed on the tail features of the target speech. Therefore, a last word of text content may be displayed rapidly on a screen.

17 Claims, 4 Drawing Sheets

The frame identification of the utmost blank frame

METHOD AND DEVICE FOR PROCESSING SPEECH BASED ON ARTIFICIAL INTELLIGENCE

CROSS-REFERENCE TO RELATED APPLICATIONS

This application is based on and claims a priority to Chinese Patent Application Serial No. 201611132359.X, filed on Dec. 9, 2016, the entire content of which is incorporated herein by reference.

TECHNICAL FIELD

The present disclosure relates to the field of information processing technology, and more particularly, to a method and a device for processing a speech based on artificial intelligence.

BACKGROUND

Artificial Intelligence (short for AI) is a new technical science studying and developing theories, methods, techniques and application systems for simulating, extending and expanding human intelligence. The artificial intelligence is a branch of computer science, which attempts to know the essence of intelligence and to produce an intelligent robot capable of acting as a human. The researches in this field include robots, speech recognition, image recognition, natural language processing and expert systems, etc. The speech recognition is a most important aspect of the artificial intelligence.

At present, a user may input text to express via inputting speeches. For example, a search is performed via speech, or chatting content may be input via inputting the speeches. If there is a need to display text content of the speech, the speech is decoded usually by using a Connectionist Temporal Classification (CTC for short) model. During a process of decoding the speech based on the CTC model, there will be a CTC peak after a word is obtained. During a process of displaying this word on a screen, it is required to obtain a CTC peak of a next word (that is, this word is not displayed until the CTC peak of the next word appears).

In practice, it is common that the user is silent when pressing a button of a microphone for a long period of time, or there is a long period of silence in a sentence to be sent. In these cases, a last word of a previous section cannot be displayed on the screen because it is required to wait for a release of the button of the microphone by the user or the long period of silence to pass during the process of decoding the speech based on the CTC model in the related art.

SUMMARY

Embodiments of the present disclosure provide a method for processing a speech based on artificial intelligence. The method includes: performing a silence detection on a speech to be decoded; cutting the speech to be decoded off to obtain a target speech if detecting that the speech to be detected is a silent speech; resetting tail features of the target speech with preset tail features of silent frames; and performing a CTC decoding process on the target speech reset.

Embodiments of the present disclosure provide a device for processing a speech based on artificial intelligence. The device includes: a processor; a memory, configured to store instructions executable by the processor; in which the processor is configured to: perform a silence detection on a speech to be decoded; cut the speech to be decoded off to obtain a target speech if detecting that the speech to be detected is a silent speech; reset tail features of the target speech with preset tail features of silent frames; and perform a CTC decoding process on the target speech reset.

Embodiments of the present disclosure provide a non-transitory computer readable storage medium. When instructions stored in the storage medium is executed by a processor of a server terminal, a method for processing a speech based on artificial intelligence may be executed by the server terminal. The method includes: performing a silence detection on a speech to be decoded; cutting the speech to be decoded off to obtain a target speech if detecting that the speech to be detected is a silent speech; resetting tail features of the target speech with preset tail features of silent frames; and performing a CTC decoding process on the target speech reset.

Embodiments of the present disclosure provide a computer program product. When instructions in the computer program product are executed by a processor, a method for processing a speech based on artificial intelligence is performed. The method includes: performing a silence detection on a speech to be decoded; cutting the speech to be decoded off to obtain a target speech if detecting that the speech to be detected is a silent speech; resetting tail features of the target speech with preset tail features of silent frames; and performing a CTC decoding process on the target speech reset.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
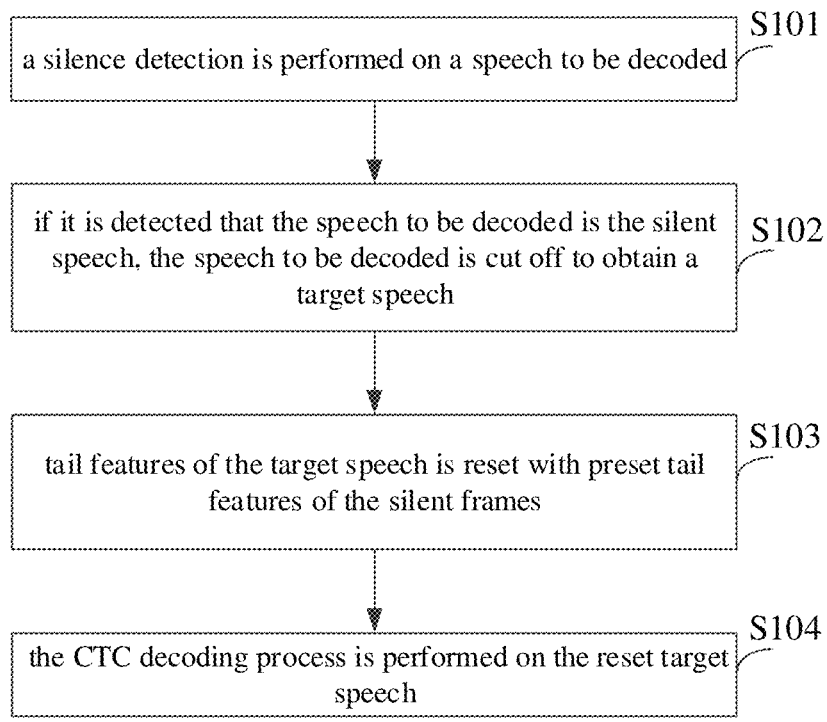
FIG. 1 is a flow chart illustrating a method for processing a speech based on artificial intelligence according to embodiments of the present disclosure.

Embodiments of the present disclosure will be described in detail and examples of embodiments are illustrated in the drawings. The same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

A method and a device for processing a speech based on artificial intelligence according to embodiments of the present disclosure will be described with reference to the drawings.

FIG. 1 is a flow chart illustrating a method for processing a speech based on artificial intelligence according to embodiments of the present disclosure. The method includes followings.

At act S101, a silence detection is performed on a speech to be decoded.

In practice, when a long period of silence is carried in the speech to be decoded, it is required to wait for a long period of time to display a last word of a previous section before the long period of silence on a screen during a process of decoding the speech. In order to solve the above problem, it needs to detect whether silent frames are carried in the speech to be decoded firstly. In embodiments, the silence detection is performed on the speech to be decoded. Further, it is determined whether the speech to be decoded is a silent speech or not via the silence detection.

Figure 2:
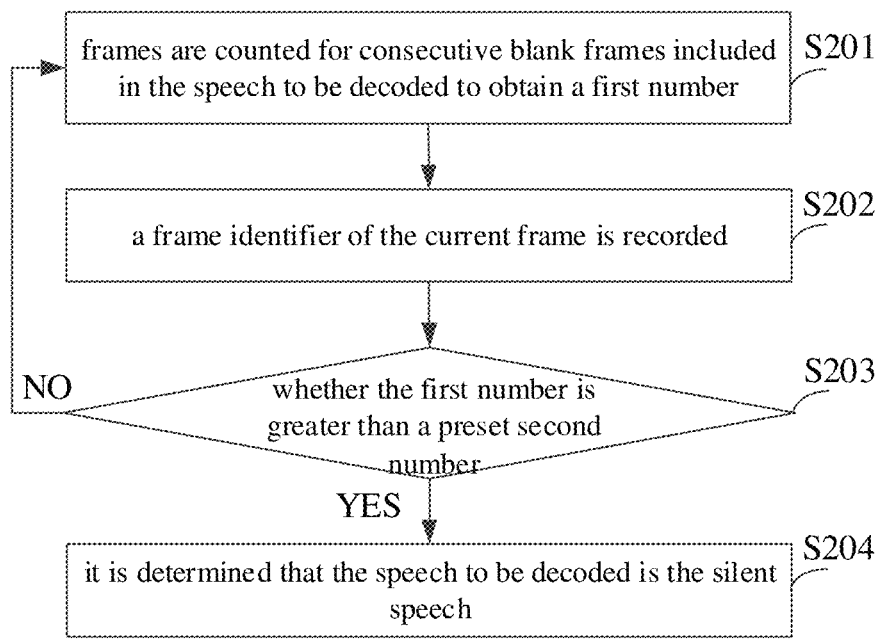
FIG. 2 is a flow chart illustrating a silence detection according to embodiments of the present disclosure.

FIG. 2 is a flow chart illustrating a silence detection according to embodiments of the present disclosure. In detail, the silence detection includes followings.

At act S201, frames are counted for consecutive blank frames included in the speech to be decoded to obtain a first number.

Generally, when the user records speeches in silent, some blank frames may be carried in the recorded speech. That is to say, the frames within a period corresponding to that the user is in silent are blank frames. The blank frame may generally not carry valid text content.

In embodiments, spectrum features of a current frame and energy carried by the current frame may be acquired and it is determined whether the current frame is the blank frame according to the spectrum features of the current frame and the energy carried by the current frame. In practice, there may be some short-time pauses when the user inputs the speeches. In order to avoid determining a speech generated under this case as the silent speech, in embodiments, it is required to count the frames for the consecutive blank frames included in the speech to be decoded to obtain the first number of the frames for the consecutive black frames.

At act S202, a frame identifier of the current frame is recorded.

Further, in embodiments, the frame identifier of a current blank frame may be recorded. A last blank frame counted may be located rapidly according to the frame identifier.

At act S203, it is judged whether the first number is greater than a preset second number.

In embodiments, the preset second number is set previously. For example, the preset second number may be preset to be 50. After the first number of blank frames included in the speech to be decoded is acquired, the first number is compared to the preset second number, to judge whether the first number is greater than the preset second number. If it is judged that the first number is greater than the preset second number, an act S204 is executed. If it is judged that the first number is not greater than the preset second number, the act S201 is executed.

At act S204, it is determined that the speech to be decoded is the silent speech.

If the first number is greater than the preset second number, it is illustrated that, relative much more blank frames are included in the speech to be decoded. Therefore, it may be determined that the speech to be decoded is the silent speech.

At act S102, if it is detected that the speech to be decoded is the silent speech, the speech to be decoded is cut off to obtain a target speech.

When it is detected that the speech to be decoded is the silent speech, in order to display the last word of the text content carried by the speech to be decoded, or display rapidly words of the text content carried by the front section before the blank frames included in the speech to be decoded, in embodiments, the speech to be decoded is cut off to obtain the target speech.

In detail, during a process of identifying the blank frames included in the speech to be decoded, the blank frame may be identified and counted. If the number of the blank frames identified is greater than the preset second number, the speech to be decoded may be cut off at a location of an utmost blank frame. The target speech is composed of the frames backward from the location of the utmost blank frame. In embodiments, the utmost blank frame is a last blank frame in the consecutive blank frames included in the target speech. The first number of the frames for the consecutive blank frames is greater than the preset second number.

When the speech to be decoded is cut off, the location of the utmost blank frame may be positioned according to the recorded frame identifier of the current frame during counting.

At act S103, tail features of the target speech is reset with preset tail features of the silent frames.

In embodiments, the tail features of the silent frames may be set previously. The CTC peak may be generated from the tail features of the silent frames during performing the CTC decoding process on the speech. The tail features may be obtained by extracting features from historical silent frames in a machine learning manner.

After the target speech is acquired, some of the preset tail features of the silent frames are selected to reset the tail features of the target speech. In detail, several tail frames that need to be reset may be selected from the target speech, and several tail frames of the silent frames are selected correspondingly. The tail features of the tail frames selected from the target speech are reset with the tail features of the silent frames selected.

At act S104, the CTC decoding process is performed on the reset target speech.

In detail, the reset target speech is input into a preset CTC model to be decoded. When the speech is decoded by the CTC model, and if it is required to display a current word in the text content carried by the speech on the screen, the current word may be not displayed on the screen until the CTC peak of a next word is obtained.

In embodiments, after the tail features of the target speech are reset, the reset target speech may be input into an acoustic model again to be graded and then input into the CTC model to be decoded. When the decoding proceeds to the tail frames of the target speech, as the preset tail features of the silent frames may be used, which may generate the CTC peak when performing the CTC decoding process, the tail features of the tail frames of the target speech are reset. Then, there may be one CTC peak when the decoding proceeds to the tail frames of the reset target speech. When the decoding proceeds to the tail frames of the target speech, it is judged whether the CTC peak may be obtained. If the CTC peak may be obtained, the last word of the text content carried by the target speech is displayed on the screen.

With the method according to embodiments of the present disclosure, by performing the silence detection on the speech to be decoded, if it is detected that the speech to be detected is the silent speech, the speech to be decoded is cut off to obtain the target speech, the tail features of the target speech is reset with the preset tail features of the silent frames and the CTC decoding process is performed on the reset target speech. In embodiments, when a large number of blank frames are carried in the speech to be decoded, the speech to be decoded is cut off, and the tail features of the target speech is placed with the tail features of the silent frames such that there may be one CTC peak when the CTC decoding process is performed on the tail features of the target speech. Therefore, a last word of the text content carried by the previous section before a large number of blank frames of the speech to be decoded may be displayed rapidly on a screen.

Figure 3:
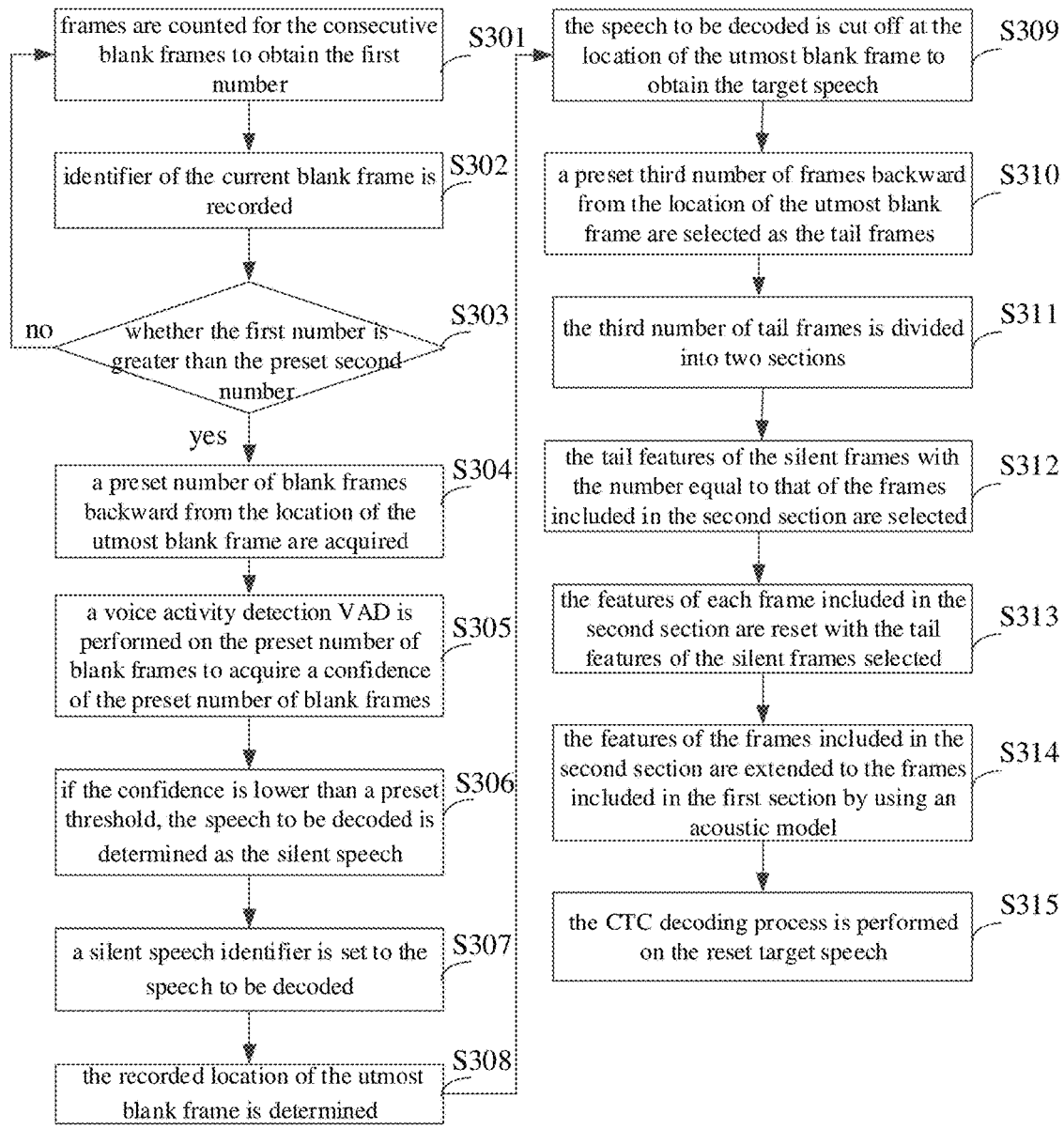
FIG. 3 is a flow chart illustrating another method for processing a speech based on artificial intelligence according to embodiments of the present disclosure.

FIG. 3 is a flow chart illustrating another method for processing a speech based on artificial intelligence according to embodiments of the present disclosure. As illustrated in FIG. 3, the method includes followings.

At act S301, frames are counted for the consecutive blank frames included in the speech to be decoded to obtain the first number.

At act S302, the frame identifier of the current blank frame is recorded.

At act S303, it is judged whether the first number is greater than the preset second number.

Details of acts S301-S303 may be referred to descriptions in the above embodiments, which are not elaborated herein.

If it is judged that the first number is greater than the preset second number, an act S304 is executed; otherwise, the act S301 is executed.

At act S304, a preset number of blank frames backward from the location of the utmost blank frame are acquired.

In embodiments, in order to avoid identifying the frame carrying less content as the blank frame in error, when the first number is greater than the preset second number, the preset number of blank frames backward from the location of the utmost blank frame may be acquired. For example, the preset number may be 20.

At act S305, a voice activity detection VAD is performed on the preset number of blank frames to acquire a confidence of the preset number of blank frames.

In embodiments, the confidence of the preset number of blank frames may be acquired by performing the Voice Activity Detection (VAD for short) on the preset number of blank frames. In detail, the preset number of blank frames may be detected by a preset model (such as VAD) to obtain the confidence of the preset number of blank frames.

At act S306, if the confidence is lower than a preset threshold, it is determined that the speech to be decoded is the silent speech.

In embodiments, the preset threshold is set previously. The preset threshold may be set empirically. After the confidence of the preset number of blank frames is acquired, the confidence is compared to the preset threshold. If the confidence is lower than the preset threshold, it is determined that the speech to be decoded is the silent speech. In embodiments, after the preset number of blank frames may be detected by using the VAD, an accuracy of identifying the blank frames in the speech to be decoded may be improved and a probability of identifying the frame carrying less content as the blank frame is reduced.

At act S307, a silent speech identifier is set to the speech to be decoded.

Further, in embodiments, when it is identified that the speech to be decoded is the silent speech, the silent speech identifier may be set to the speech to be decoded. For example, the silent speech identifier may be "1" and a non-silent speech identifier may be "0".

At act S308, the recorded location of the utmost blank frame is determined.

At act S309, the speech to be decoded is cut off at the location of the utmost blank frame to obtain the target speech.

After the speech to be decoded is identified as the silent frame, the location of the utmost blank frame may be determined according to the recorded frame identifier of the current frame during counting. The speech to be decoded may be cut off at the location of the utmost blank frame to obtain the target speech.

At act S310, a preset third number of frames backward from the location of the utmost blank frame are selected as the tail frames.

In order to display rapidly the last word of the text content carried by the target speech on the screen, in embodiments, the tail features of the target speech may be reset. In detail, the tail features to be reset are selected from the target speech; preferably the preset third number of frames backward from the location of the utmost blank frame may be selected as the tail frames. In embodiments, the tail features of the selected tail frames are placed with the tail features of the silent frames.

At act S311, the third number of tail frames is divided into two sections, of which a first section includes a preset fourth number of frames backward from the location of the utmost blank frame and a second section includes remainder frames included in the tail frames except from the frames included in the first section.

Figure 4:
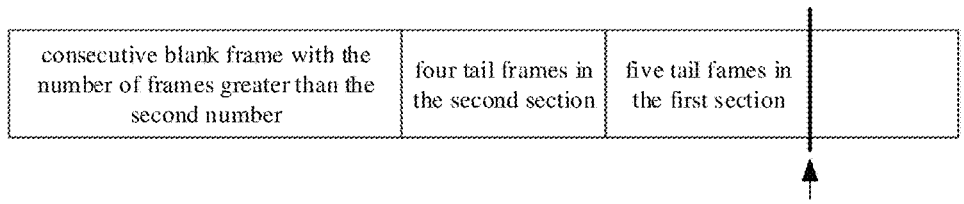
FIG. 4 is a schematic diagram of selecting tail frames from a target speech according to embodiments of the present disclosure.

FIG. 4 is a schematic diagram of selecting tail frames from a target speech according to embodiments of the present disclosure. As illustrated in FIG. 4, the black thick longitudinal line represents the frame identifier of the utmost blank frame. The utmost blank frame may be located according to the frame identifier. Nine frames backward from the location of the utmost blank frame are selected as the tail frames. The first section includes 5 frames backward from the location of the utmost blank frame. The second section includes reminding 4 frames except the 5 frames included in the first section from the selected 9 frames.

At act S312, the tail features of the silent frames with the number equal to that of the frames included in the second section are selected.

In detail, after the frames included in the second section are determined, the number of the frames included in the second section may be acquired. For resetting the features of each frame included in the second section, it is required to select the tail features of the silent frames with the number equal to that of the frames included in the second section. For example, if the number of frames included in the second section is 4, the tail features of 4 frames are selected.

At act S313, the features of each frame included in the second section are reset with the tail features of the silent frames selected.

In detail, the tail features of the silent frames selected are copied in respective frames included in the second section. The features of the respective frames are placed with the tail features of the silent frames. That is, the features of the respective frames included in the second section are reset with the tail features of the silent frames.

At act S314, the features of the frames included in the second section are extended to the frames included in the first section by using an acoustic model.

In order to achieve the speech decoding better, in embodiments, the features of each frame included in the second section reset may be extended to features of each frame included in the first section. In detail, by using the acoustic model, the features of each frame included in the first section are graded based on the features of each frame included in the second section, to extend the features of each frame included in the first section.

At act S315, the CTC decoding process is performed on the reset target speech.

In embodiments, when the decoding proceeds to the tail frames of the target speech, as the tail features of the tail frames of the target speech are reset, such that there may be one CTC peak during decoding the tail frames of the target speech. When the CTC peak may be obtained, the last word of the text content carried by the target speech may be displayed on the screen.

With the method according to embodiments of the present disclosure, by performing the silence detection on the speech to be decoded, if it is detected that the speech to be decoded is the silent speech, the speech to be decoded is cut off to obtain the target speech, the tail features of the target speech is reset with the preset tail features of the silent frames and the CTC decoding process is performed on the reset target speech. In embodiments, when a large number of blank frames are carried in the speech to be decoded, the speech to be decoded is cut off, and the tail features of the target speech is placed with the tail features of the silent frames such that there may be one CTC peak when the CTC decoding process is performed on the tail features of the target speech. Therefore, a last word of the text content carried by the previous section before a large number of blank frames of the speech to be decoded may be displayed rapidly on a screen.

Figure 5:
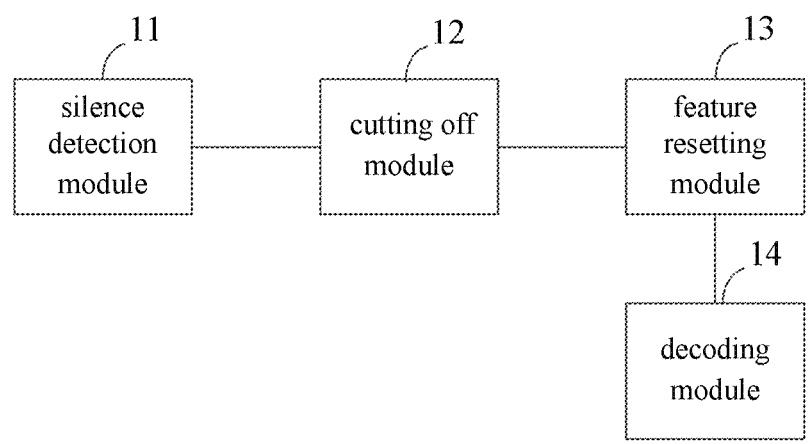
FIG. 5 is a block diagram illustrating a device for processing a speech based on artificial intelligence according to embodiments of the present disclosure.

FIG. 5 is a block diagram illustrating a device for processing a speech based on artificial intelligence according to embodiments of the present disclosure. As illustrated in FIG. 5, the device includes: a silence detection module 11, a cutting off module 12, a feature resetting module 13 and a decoding module 14.

The silence detection module 11 is configured to perform a silence detection on a speech to be decoded.

The cutting off module 12 is configured to cut the speech to be decoded off if the speech to be decoded is detected as a silent speech.

The feature resetting module 13 is configured to reset tail features of the target speech with preset tail features of silent frames.

The decoding module 14 is configured to perform a CTC decoding process on the target speech reset.

Figure 6:
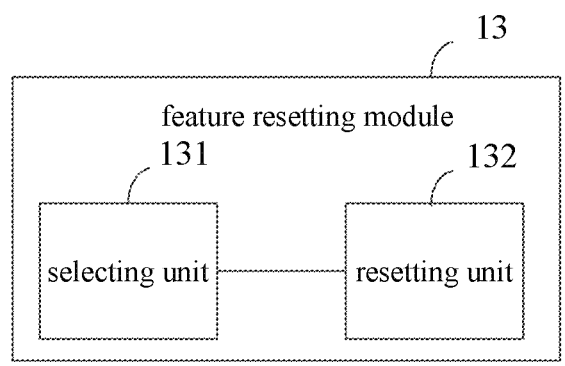
FIG. 6 is a block diagram illustrating a feature resetting module according to embodiments of the present disclosure.

FIG. 6 is a block diagram of a feature resetting module according to embodiments of the present disclosure. As illustrated in FIG. 6, the feature resetting module includes: a selecting unit 131 and a resetting unit 132.

The selecting unit 131 is configured to select from the target speech, a plurality of tail frames of which features are to be reset.

The resetting unit 132 is configured to reset features of the plurality of tail frames with the preset tail features of silent frames.

Further, the selecting unit 131 is specifically configured to determine a location of an utmost blank frame included in the target speech, in which the utmost blank frame is a last blank frame of consecutive blank frames included in the target speech, and a first number that is the number of the consecutive blank frames is greater than a preset second number, and to select a preset third number of frames backward from the location of the utmost blank frame as the tail frames.

The resetting unit 132 is specifically configured to divide the tail frames into two sections, of which a first section includes a preset fourth number of frames backward from the location of the utmost blank frame, and a second section includes remainder frames included in the tail frames except from frames included in the first section; to select tail features of silent frames with the number equal to that of frames included in the second section; to reset features of the frames included in the second section with the tail features of the silent frames selected; and to extend the features of the frames included in the second section to the frames included in the first section by using an acoustic model.

Further, the cutting off module 12 is specifically configured to cut the speech to be decoded off at the location of the utmost blank frame to obtain the target speech.

Figure 7:
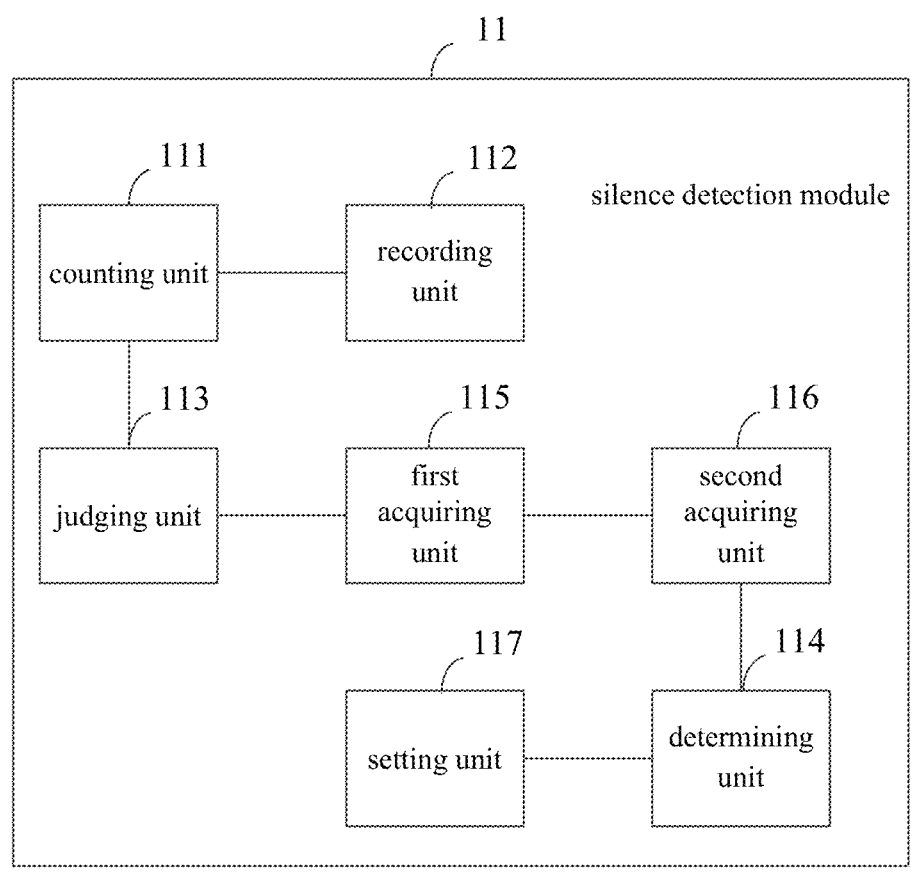
FIG. 7 is a block diagram illustrating a silence detection module according to embodiments of the present disclosure.

FIG. 7 is a block diagram of a silence detection module according to embodiments of the present disclosure. As illustrated in FIG. 7, the silence detection module 11 includes: a counting unit 111, a recording unit 112, a judging unit 113, a determining unit 114, a first acquiring unit 115, a second acquiring unit 116 and a setting unit 117.

The counting unit 111 is configured to count frames for the consecutive blank frames included in the speech to be decoded to obtain the first number.

The recording unit 112 is configured to record a frame identifier of a current frame.

The judging unit 113 is configured to judge whether the first number is greater than the preset second number.

The determining unit 114 is configured to determine the speech to be decoded as the silent speech if the first number is greater than the preset second number.

Further, the first acquiring unit 115 is configured to acquire a preset number of blank frames backward from the location of the utmost blank frame if the first number is greater than the preset second number.

The second acquiring unit 116 is configured to perform a voice activity detection VAD on the preset number of blank frames to acquire a confidence of the preset number of blank frames.

The determining unit 114 is further configured to determine the speech to be decoded as the silent speech if the confidence is lower than a preset threshold.

The setting unit 117 is configured to set a silent speech identifier to the speech to be decoded. Further, the selecting unit 131 is specifically configured to determine the location of the utmost blank frame according to the frame identifier of the current frame recorded.

Further, the decoding module 14 is specifically configured to input the target speech reset to a preset CTC model to perform a decoding; to judge whether a CTC peak is obtained when decoding the tail frames after the tail frames are decoded; and to display a last word of a text content corresponding to the target speech on a screen if the CTC peak is obtained.

With the device according to embodiments of the present disclosure, by performing the silence detection on the speech to be decoded, if it is detected that the speech to be decoded is the silent speech, the speech to be decoded is cut off to obtain the target speech, the tail features of the target speech is reset with the preset tail features of the silent frames and the CTC decoding process is performed on the reset target speech. In embodiments, when a large number of blank frames are carried in the speech to be decoded, the speech to be decoded is cut off, and the tail features of the target speech is placed with the tail features of the silent frames such that there may be one CTC peak when the CTC decoding process is performed on the tail features of the target speech. Therefore, a last word of the text content carried by the previous section before a large number of blank frames of the speech to be decoded may be displayed rapidly on a screen.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means at least two, such as two, three, etc., unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

The logic and/or steps described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for processing a speech based on artificial intelligence, comprising:
   performing, by at least one computing device, a silence detection on a speech to be decoded;
   cutting, by the at least one computing device, the speech to be decoded off to obtain a target speech if detecting that the speech to be detected is a silent speech;
   resetting, by the at least one computing device, tail features of the target speech with preset tail features of silent frames; and
   performing, by the at least one computing device, a Connectionist Temporal Classification (CTC) decoding process on the target speech reset;
   wherein resetting, by the at least one computing device, tail features of the target speech with preset tail features of silent frames comprises:

selecting, by the at least one computing device, from the target speech, a plurality of tail frames of which features are to be reset; and resetting, by the at least one computing device, features of the plurality of tail frames with the preset tail features of silent frames;

wherein selecting, by the at least one computing device, from the target speech, a plurality of tail frames of which features are to be reset comprises:

determining, by the at least one computing device, a location of an utmost blank frame comprised in the target speech, wherein the utmost blank frame is a last blank frame of consecutive blank frames comprised in the target speech, and a first number that is the number of the consecutive blank frames is greater than a preset second number; and selecting, by the at least one computing device, a preset third number of frames backward from the location of the utmost blank frame as the tail frames.

2. The method according to claim 1, wherein resetting, by the at least one computing device, features of the plurality of tail frames with the preset tail features of preset silent frames comprises:

dividing, by the at least one computing device, the tail frames into two sections, of which a first section comprises a preset fourth number of frames backward from the location of the utmost blank frame, and a second section comprises remainder frames comprised in the tail frames except from frames comprised in the first section;

selecting, by the at least one computing device, tail features of silent frames with the number equal to that of frames comprised in the second section;

resetting, by the at least one computing device, features of the frames comprised in the second section with the tail features of the silent frames selected; and extending, by the at least one computing device, the features of the frames comprised in the second section to the frames comprised in the first section by using an acoustic model.

3. The method according to claim 2, wherein cutting, by the at least one computing device, the speech to be decoded off to obtain a target speech comprises:

cutting, by the at least one computing device, the speech to be decoded off at the location of the utmost blank frame to obtain the target speech.

4. The method according to claim 3, wherein performing, by the at least one computing device, a silence detection on a speech to be decoded comprises:

counting, by the at least one computing device, frames for the consecutive blank frames comprised in the speech to be decoded to obtain the first number;

recoding, by the at least one computing device, a frame identifier of a current frame;

judging, by the at least one computing device, whether the first number is greater than the preset second number;

determining, by the at least one computing device, the speech to be decoded as the silent speech if the first number is greater than the preset second number.

5. The method according to claim 4, wherein determining, by the at least one computing device, the speech to be decoded as the silent speech if the first number is greater than the preset second number comprises:

acquiring, by the at least one computing device, a preset number of blank frames backward from the location of the utmost blank frame;

performing, by the at least one computing device, a voice activity detection VAD on the preset number of blank frames to acquire a confidence of the preset number of blank frames;

determining, by the at least one computing device, the speech to be decoded as the silent speech if the confidence is lower than a preset threshold; and setting, by the at least one computing device, a silent speech identifier to the speech to be decoded.

6. The method according to claim 5, wherein determining, by the at least one computing device, a location of an utmost blank frame comprised in the target speech comprises:

determining, by the at least one computing device, the location of the utmost blank frame according to the frame identifier of the current frame recorded.

7. The method according to claim 6, wherein performing, by the at least one computing device, a CTC decoding process on the target speech reset comprises:

inputting, by the at least one computing device, the target speech reset to a preset CTC model to perform a decoding;

judging, by the at least one computing device, whether a CTC peak is obtained when decoding the tail frames after the tail frames are decoded; and displaying, by the at least one computing device, a last word of a text content corresponding to the target speech on a screen if the CTC peak is obtained.

8. The method according to claim 2, wherein the third number is 9, the first section comprises 5 frames backward from the location of the utmost blank frame and the second section comprises 4 frames.

9. A device for processing a speech based on artificial intelligence, comprising:

a processor; and a memory, configured to store instructions executable by the processor, wherein the processor is configured to:

perform a silence detection on a speech to be decoded;

cut the speech to be decoded off to obtain a target speech if detecting that the speech to be detected is a silent speech;

reset tail features of the target speech with preset tail features of silent frames; and perform a Connectionist Temporal Classification (CTC) decoding process on the target speech reset;

wherein the processor is configured to reset tail features of the target speech with preset tail features of silent frames by acts of:

selecting from the target speech, a plurality of tail frames of which features are to be reset; and resetting features of the plurality of tail frames with the preset tail features of silent frames;

wherein the processor is configured to select from the target speech, a plurality of tail frames of which features are to be reset by acts of:

determining a location of an utmost blank frame comprised in the target speech, wherein the utmost blank frame is a last blank frame of consecutive blank frames comprised in the target speech, and a first number that is the number of the consecutive blank frames is greater than a preset second number; and selecting a preset third number of frames backward from the location of the utmost blank frame as the tail frames.

10. The device according to claim 9,
wherein the processor is configured to reset features of the plurality of tail frames with the preset tail features of preset silent frames by acts of:
dividing the tail frames into two sections, of which a first section comprises a preset fourth number of frames backward from the location of the utmost blank frame, and a second section comprises remainder frames comprised in the tail frames except from frames comprised in the first section;
selecting tail features of silent frames with the number equal to that of frames comprised in the second section;
resetting features of the frames comprised in the second section with the tail features of the silent frames selected; and
extending the features of the frames comprised in the second section to the frames comprised in the first section by using an acoustic model.

11. The device according to claim 10, wherein the processor is configured to cut the speech to be decoded off to obtain a target speech by acts of:
cutting the speech to be decoded off at the location of the utmost blank frame to obtain the target speech.

12. The device according to claim 11, wherein the processor is configured to perform a silence detection on a speech to be decoded by acts of:
counting frames for the consecutive blank frames comprised in the speech to be decoded to obtain the first number;
recoding a frame identifier of a current frame;
judging whether the first number is greater than the preset second number;
determining the speech to be decoded as the silent speech if the first number is greater than the preset second number.

13. The device according to claim 12, wherein the processor is configured to determine the speech to be decoded as the silent speech if the first number is greater than the preset second number by acts of:
acquiring a preset number of blank frames backward from the location of the utmost blank frame;
performing a voice activity detection VAD on the preset number of blank frames to acquire a confidence of the preset number of blank frames;
determining the speech to be decoded as the silent speech if the confidence is lower than a preset threshold; and
setting a silent speech identifier to the speech to be decoded.

14. The device according to claim 13, wherein the processor is configured to determine a location of an utmost blank frame comprised in the target speech by acts of:
determining the location of the utmost blank frame according to the frame identifier of the current frame recorded.

15. The device according to claim 14, wherein the processor is configured to perform a CTC decoding process on the target speech reset by acts of:
inputting the target speech reset to a preset CTC model to perform a decoding;
judging whether a CTC peak is obtained when decoding the tail frames after the tail frames are decoded; and
displaying a last word of a text content corresponding to the target speech on a screen if the CTC peak is obtained.

16. The device according to claim 10, wherein the third number is 9, the first section comprises 5 frames backward from the location of the utmost blank frame and the second section comprises 4 frames.

17. A non-transitory computer readable storage medium comprising instructions, wherein when the instructions are executed by a processor of a device, the device is caused to perform a method for processing a speech based on artificial intelligence, and the method comprises:
performing a silence detection on a speech to be decoded;
cutting the speech to be decoded off to obtain a target speech if detecting that the speech to be detected is a silent speech;
resetting tail features of the target speech with preset tail features of silent frames; and
performing a Connectionist Temporal Classification (CTC) decoding process on the target speech reset;
wherein resetting tail features of the target speech with preset tail features of silent frames comprises:
selecting from the target speech, a plurality of tail frames of which features are to be reset; and
resetting features of the plurality of tail frames with the preset tail features of silent frames;
wherein selecting from the target speech, a plurality of tail frames of which features are to be reset comprises:
determining a location of an utmost blank frame comprised in the target speech, wherein the utmost blank frame is a last blank frame of consecutive blank frames comprised in the target speech, and a first number that is the number of the consecutive blank frames is greater than a preset second number; and
selecting a preset third number of frames backward from the location of the utmost blank frame as the tail frames.

* * * * *